(12) United States Patent
Hirahara et al.

(10) Patent No.: US 9,618,379 B2
(45) Date of Patent: Apr. 11, 2017

(54) LIQUID AMOUNT MEASURING DEVICE

(71) Applicant: AISAN KOGYO KABUSHIKI KAISHA, Aichi-ken (JP)

(72) Inventors: Shinsuke Hirahara, Aichi-ken (JP); Masaki Ikeya, Aichi-ken (JP)

(73) Assignee: AISAN KOGYO KABUSHIKI KAISHA, Obu-Shi, Aichi-ken (JP)

( * ) Notice: Subject to any disclaimer, the term of this patent is extended or adjusted under 35 U.S.C. 154(b) by 41 days.

(21) Appl. No.: 14/571,210

(22) Filed: Dec. 15, 2014

(65) Prior Publication Data

US 2015/0177048 A1 Jun. 25, 2015

(30) Foreign Application Priority Data

Dec. 19, 2013 (JP) .................. 2013-262604

(51) Int. Cl.
*G01F 23/38* (2006.01)
(52) U.S. Cl.
CPC .................... *G01F 23/38* (2013.01)
(58) Field of Classification Search
CPC .................................................. G01F 23/003
USPC ............................................................ 73/313
See application file for complete search history.

(56) References Cited

U.S. PATENT DOCUMENTS

| | | | | |
|---|---|---|---|---|
| 6,748,805 B2* | 6/2004 | Lease | .................. | G01F 23/0061 116/228 |
| 2005/0051141 A1* | 3/2005 | Rumpf | ................. | B60K 15/077 123/514 |
| 2012/0174667 A1* | 7/2012 | Miyagawa | .............. | G01F 23/36 73/304 R |

FOREIGN PATENT DOCUMENTS

| | | |
|---|---|---|
| JP | S62-170528 U | 10/1987 |
| JP | H05-288589 | 11/1993 |
| JP | 2000-035356 | 2/2000 |
| JP | 2003227742 A | 8/2003 |
| JP | 3969340 | 9/2007 |
| JP | 2012-145385 A | 8/2012 |

OTHER PUBLICATIONS

English Abstract of Japanese Patent Application No. JPH05-288589.

(Continued)

*Primary Examiner* — Paul West
*Assistant Examiner* — Mark A Shabman
(74) *Attorney, Agent, or Firm* — Vierra Magen Marcus LLP

(57) ABSTRACT

A liquid amount measuring device 10 includes a plurality of detectors 36, 22 arranged within a vessel, each of the plurality of detectors being configured to output a first analog signal, and an output circuit 38 configured to output an analog detection signal corresponding to an amount of the liquid stored in the vessel based on the first analog signals outputted by the detectors. Each of the detectors 36, 22 includes a float 24, 32; an arm member 26, 34 configured to convert a vertical motion of the float 24, 32 to a rotational motion; and a magnetic sensor 31, 41 configured to output a second analog signal corresponding to the rotational motion of the arm member. The output circuit 38 is configured to correct the first analog signals outputted from the detectors 22, 36 and add the corrected first analog signals so as to output the analog detection signal.

14 Claims, 4 Drawing Sheets

(56) References Cited

OTHER PUBLICATIONS

Machine Translation prepared by the Japanese Patent Office of Japanese Patent Application No. JPH05-288589.
English Abstract of Japanese Patent Application No. JP3969340.
Machine Translation prepared by the Japanese Patent Office of Japanese Patent Application No. JP3969340.
English Abstract of Japanese Patent Application No. JP2000-035356.
Machine Translation prepared by the Japanese Patent Office of Japanese Patent Application No. JP2000-035356.
Office Action dated Jun. 22, 2015, in Korean Patent Application No. 10-2014-0127140.
Office Action dated Nov. 30, 2016 in Japanese Patent Application No. JP 2013-262604.
English Abstract of JP2012145385A published on Aug. 2, 2012.
English and Machine translation of JPS62-170528 published Oct. 29, 1987.

* cited by examiner

LIQUID AMOUNT MEASURING DEVICE

CROSS-REFERENCE TO RELATED APPLICATION

This application claims priority to Japanese Patent Application No. 2013-262604 filed on Dec. 19, 2013, the contents of which are hereby incorporated by reference into the present application.

TECHNICAL FIELD

The present teachings relate to a liquid amount measuring device configured to measure an amount of liquid stored within a vessel (for example, a device configured to measure the amount of fuel stored within a fuel tank in an automobile or the like).

DESCRIPTION OF RELATED ART

The liquid amount measuring device of this type may include a plurality of detectors disposed within a vessel. For example, a liquid amount measuring device disclosed in Japanese Patent Application Publication No. H5-288589 measures a liquid amount of fuel stored within a saddle-shaped fuel tank including a main storage part and a sub storage part. This liquid amount measuring device includes a resistance type fuel sender configured to detect a liquid level (liquid amount) of fuel stored within the main storage part and a resistance type fuel sender configured to detect a liquid level (liquid amount) of the fuel stored within the sub storage part. This plurality of fuel senders and a fuel meter are connected in series so that signals from this plurality of fuel senders are inputted to the fuel meter.

BRIEF SUMMARY

The liquid amount measuring device disclosed in Japanese Patent Application Publication No. H5-288589 employs a resistance type detector. The resistance type detector can be affected by wear in components and foreign matters, and thus cannot measure the liquid level (liquid amount) accurately. Therefore, a use of a detector utilizing a magnetic sensor has been considered. However, in a case of the detector utilizing the magnetic sensor, when a plurality of detectors is to be disposed within a vessel, the plurality of detectors cannot be connected to a liquid amount meter in series, unlike the resistance type detector. Therefore, there has been a problem that many output signal lines are required because each signal must be outputted by each of the detectors directly to the liquid amount meter. The present teachings provide a liquid amount measuring device which can suppress an increase in output signal lines even when the plurality of detectors are disposed within the vessel in a case where the detector utilizing the magnetic sensor is employed.

The liquid amount measuring device disclosed as one aspect of the present teachings is configured to output an analog detection signal corresponding to an amount of the liquid stored in the vessel. The liquid amount measuring device comprises a plurality of detectors arranged within the vessel, wherein each of the plurality of detectors is configured to output a first analog signal; an output circuit configured to output an analog detection signal corresponding to an amount of the liquid stored in the vessel based on the first analog signals outputted by the plurality of detectors; and correction circuits, each of which is provided to each of the detectors and arranged between the corresponding detector and the output circuit; each correction circuit is configured to correct the first analog signal outputted by the corresponding detector and output the corrected first analog signal to the output circuit. Each of the detectors includes a float; an arm member configured to convert a vertical motion of the float to a rotational motion; and a magnetic sensor configured to output a second analog signal corresponding to the rotational motion of the arm member. Each of the detectors is configured to output the first analog signal based on the second analog signal. The corrected first analog signals outputted from the correction circuits are inputted to the output circuit, and the output circuit outputs the analog detection signal corresponding to the amount of the liquid stored in the vessel based on the corrected first analog signals that were inputted.

In the above-described liquid amount measuring device, the first analog signals outputted by the plurality of detectors are inputted to the output circuit. The output circuit outputs the analog detection signal corresponding to the amount of the liquid within the vessel based on the first analog signals inputted by the plurality of detectors. Thus, the signals from the plurality of detectors are outputted via the output circuit to external equipment, thereby making it possible to suppress the increase in the signal output lines configured to connect the liquid amount measuring device and the external equipment. The signals from the respective detectors are inputted to the output circuit via the corresponding correction circuits, and thus can be corrected by the correction circuits for easy processing in the output circuit. As a result, it is possible to simplify functions of the output circuit.

Another liquid amount measuring device disclosed as another aspect of the present specification enables an output range of the signals outputted thereby to be a desired range. Specifically, a liquid amount measuring device of this type is normally connected to a liquid amount meter during use, and the detection signal (analog signals) from the liquid amount measuring devices is inputted to the liquid amount meter. The liquid amount meter indicates the amount of a liquid stored in the vessel corresponding to a voltage value of the detection signal from the liquid amount measuring device. Therefore, when the output range of the detection signal outputted by the liquid amount measuring device changes, the liquid amount is not correctly indicated on the liquid amount meter if no adjustment is made. If a configuration is employed such that a plurality of detectors are arranged in the vessel and analog signals outputted by this plurality of detectors are inputted to the liquid amount meter via an output circuit, the output range of the analog signals inputted to the liquid amount meter might change as compared with a case where the signals outputted by the detectors are directly inputted to the liquid amount meter. Therefore, in order to correctly indicate the liquid amount on the liquid amount meter, additional adjustments need to be made to the liquid amount meter. To this end, the other liquid amount measuring device disclosed in the present specification sets the output range of the signal outputted thereby to be within a desired range, enabling the liquid amount meter to correctly indicate the liquid amount without adjusting the liquid amount meter.

Specifically, another liquid amount measuring device disclosed in the present teachings is configured to output an analog detection signal corresponding to an amount of liquid stored in the vessel. This liquid amount measuring device is provided with a plurality of detectors arranged within the vessel and an output circuit configured to output the analog detection signal corresponding to the amount of the liquid stored in the vessel based on first analog signals outputted by the plurality of detectors. The output circuit includes an adder configured to add the first analog signals outputted by the detectors, and a signal amplifier configured to amplify an adder analog signal outputted by the adder. The signal amplifier amplifies the adder analog signal outputted by the adder such that an output range of the adder analog signal outputted by the adder becomes a predetermined output range.

Also in this liquid amount measuring device, the signals from the plurality of detectors are outputted via the output circuit to an external equipment (for example, liquid amount meter), thereby making it possible to suppress an increase in signal output lines which connect the liquid amount measuring device and the external equipment. Also, the output circuit adds the signals outputted by the respective detectors, and amplifies the added signals such that an output range of the added signals becomes a predetermined output range. Therefore, it is possible to correctly operate external equipment (for example, liquid amount meter) without conducting adjustment thereof.

DETAILED DESCRIPTION OF EMBODIMENTS

Figure 1:
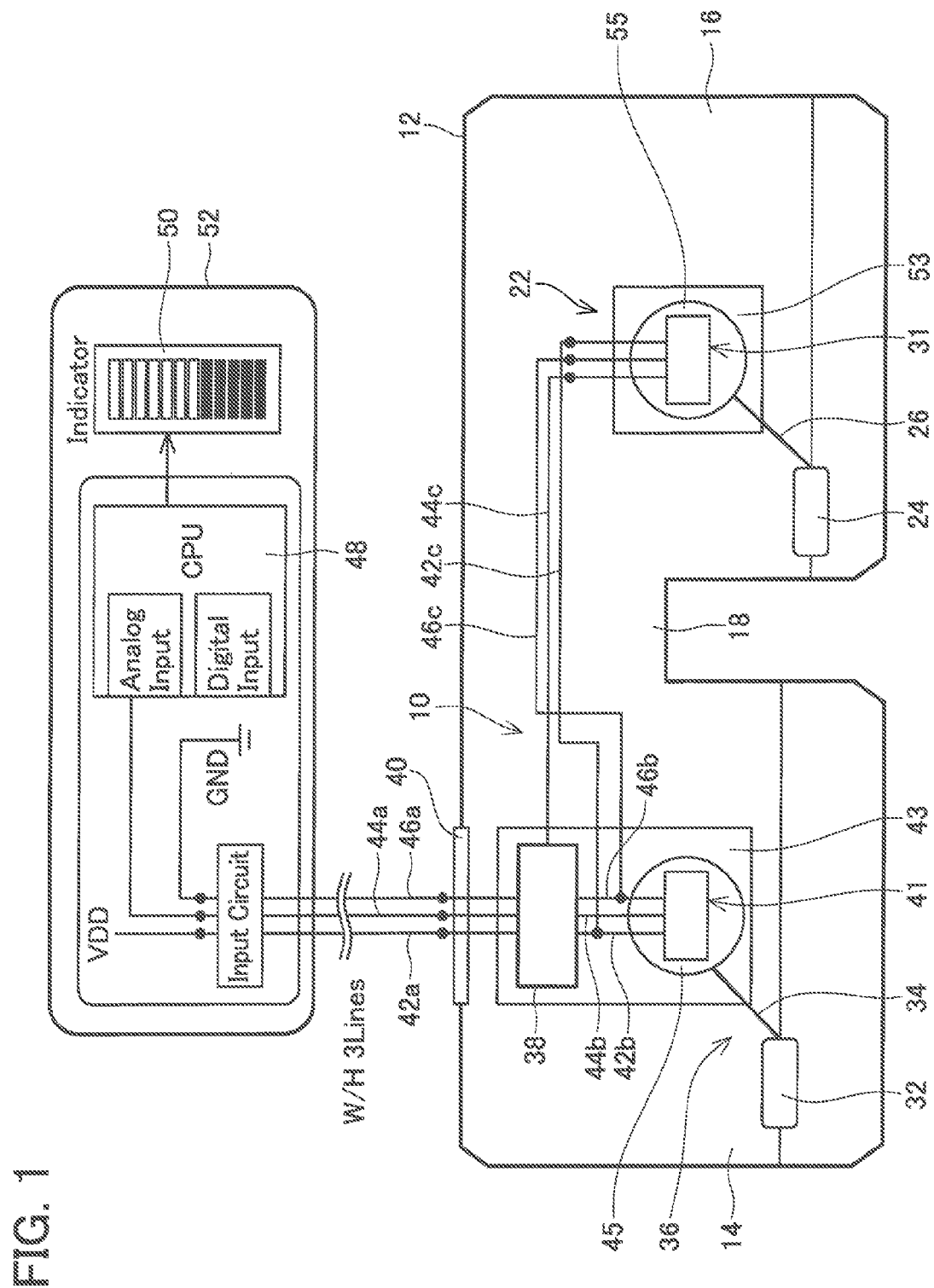
FIG. 1 is a diagram showing a configuration of a liquid amount measuring device of an embodiment.

Firstly, there are listed some of the characteristic features of embodiments which will be explained below. All of the characteristic features listed herein are independently effective.

In the liquid amount measuring device disclosed in the present specification, a vessel may include a plurality of storage parts configured such that each of liquid levels of the storage parts changes independently. A detector may be disposed within each of the storage parts. According to such a configuration, the level (amount) of the liquid stored in each of the storage parts is detected by each of the detectors, and the signal outputted by each of the detectors is corrected by a resistance corresponding to a volume ratio of the corresponding storage part, thereby making it possible to facilitate the processing in the output circuit.

In the liquid amount measuring device disclosed in the present teachings, the magnetic sensor of each of the detectors and the corresponding correction circuit to which the second analog signal from the magnetic sensor is inputted may be mounted on a same circuit board. According to such a configuration, the magnetic sensor of each of the detectors and the correction circuit corresponding to each of the detector are mounted on a same circuit board, thereby making it possible to eliminate the operation for connecting the magnetic sensor and the correction circuit when mounting the liquid amount measuring device in the vessel.

In the liquid amount measuring device disclosed in the present specification, the magnetic sensor for one of the detectors, the corresponding correction circuit to which the second analog signal from the magnetic sensor is inputted, and another correction circuit to which the second analog signal from another one of the detectors is inputted, may be mounted on a same circuit board. According to such a configuration, a plurality of correction circuits are mounted on one circuit board, thereby making it possible to eliminate the necessity to mount the magnetic sensor and the corresponding correction circuit on a same circuit board for the other detectors.

In the liquid amount measuring device disclosed in the present specification, the output circuit may include an addition function configured to add voltage values of the analog signals outputted by each of the correction circuits. According to such a configuration, the voltage values of the analog signals outputted by the respective correction circuits are added, and the added signal (voltage value) is outputted by the output circuit. Therefore, the amount of the liquid stored in the vessel can be indicated by the added signal (voltage value) by appropriate correction by the correction circuit.

It should be appreciated that a term "add" herein means not only an adding of the voltage values (for example, V1, V2) of the first analog signals outputted by the plurality of detectors without any change (for example, V1+V2) but also mean an adding of values obtained by multiplying the voltage values of these first analog signals respectively by a coefficient k (for example, k1×V1+k2×V2). Therefore, calculating of an average value (for example, ½×(V1+V2)) of the voltage values (for example, V1, V2) of the first analog signals outputted by the plurality of detectors, also applies to the "add" referred to herein.

In the liquid amount measuring device disclosed in the present specification, the vessel may be a saddle-shaped vessel, the vessel including a first storage part having a first depth, a second storage part having a second depth, and a connecting part connecting an upper portion of the first storage part to an upper portion of the second storage part, a depth of the connecting part being shallower than the first and second depth. In this case, one detector may be disposed within each of the first and second storage parts, and the output circuit may be disposed within the saddle-shaped vessel. According to this configuration, the first and second storage parts and the output circuit are disposed within the vessel, thereby making it possible to dispose signal lines configured to connect these components within the vessel. Thus, the number of signal lines penetrating the vessel can be reduced.

In the liquid amount measuring device disclosed in the present specification, the output circuit further may include an adder configured to add voltage values of the corrected first analog signals outputted by the correction circuits; and a signal amplifier configured to amplify a third analog signal outputted by the adder. The signal amplifier amplifies the third analog signal outputted by the adder such that an output range of the third analog signal outputted by the adder becomes a predetermined output range. According to such a configuration, the signal outputted by the output circuit is amplified by the signal amplifier so that an output range of the signal becomes a predetermined range. Therefore, external equipment can be appropriately operated without adjustment of the external equipment.

EMBODIMENTS

Figure 2:
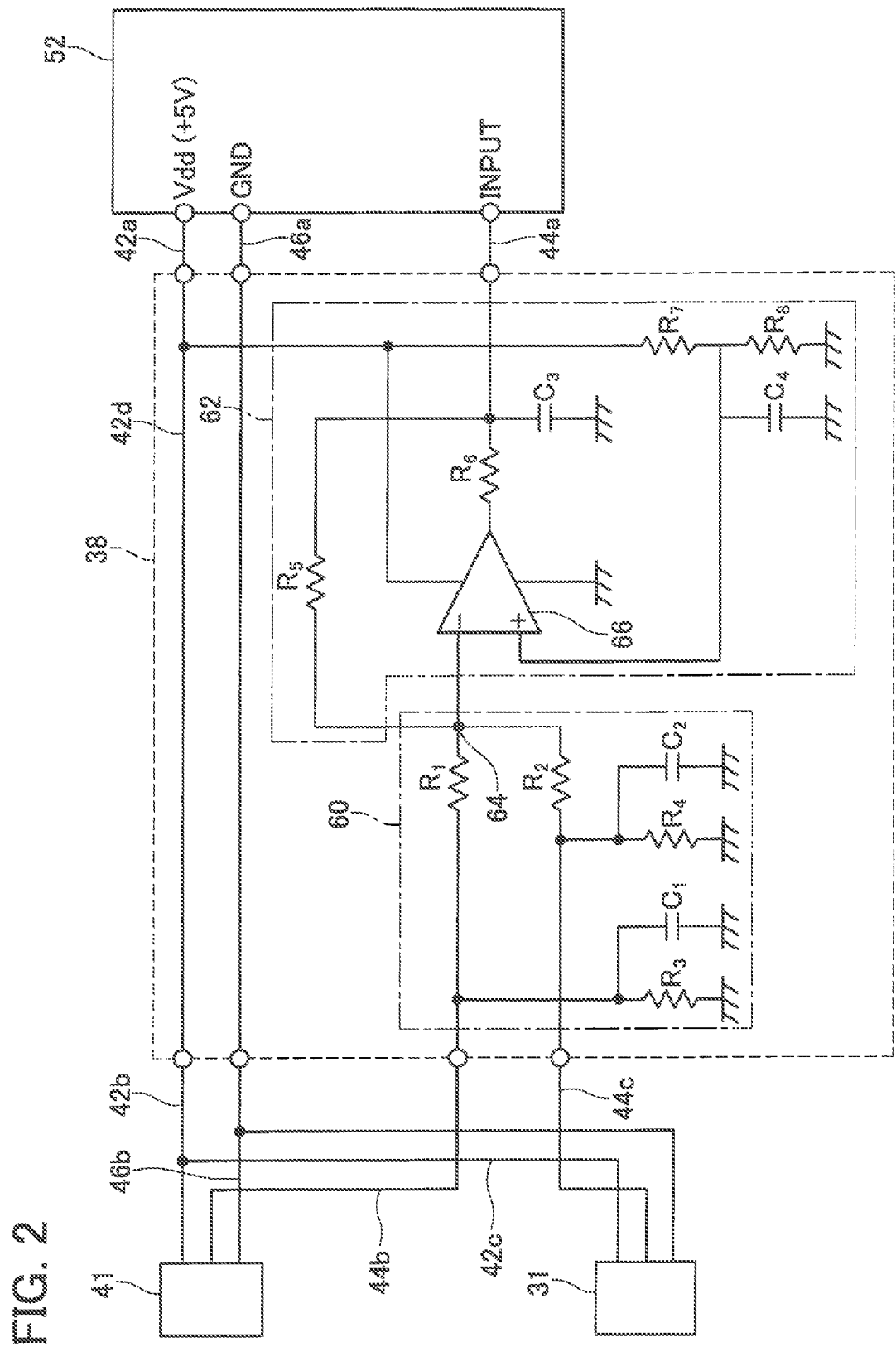
FIG. 2 is a diagram showing a circuit configuration of an output circuit.

As shown in FIG. 1, a fuel amount measuring device 10 is disposed within a saddle-shaped fuel tank 12 equipped in an automobile. As shown in FIGS. 1 and 2, the fuel amount measuring device 10 includes a first fuel amount detector 36, a second fuel amount detector 22 and an output synthetic circuit 38. The first and second fuel amount detectors 36 and 22 are connected via the output synthetic circuit 38 to a fuel meter 52.

Firstly, the saddle-shaped fuel tank 12 in which the fuel amount measuring device 10 is disposed will be explained. In the fuel tank 12, a bottom face of a center part 18 (one example of a connecting part) is located higher than a bottom face of a main storage part 14 disposed on one side of the center part 18 and a bottom face of a sub storage part 16 disposed on the other side of the center part 18. Specifically, the center part 18 connects upper portions of the main and sub storage parts 14 and 16, and a depth of the center part 18 is made shallower than depths of the main and sub storage parts 14 and 16. Therefore, when an amount of fuel stored within the fuel tank 12 is decreased so that a liquid level becomes lower than the bottom face of the center part 18, the fuel is stored into the main and sub storage parts 14 and 16, independently of each other. Specifically, the liquid level of the fuel stored within the main storage part 14 and the liquid level of the fuel stored within the sub storage part 16 can change independently. As a result, even if the amount of the fuel stored within the main storage part 14 alone is detected, a total amount of the fuel stored within the fuel tank 12 cannot be calculated accurately. Similarly, even if the amount of the fuel stored within the sub storage part 16 alone is detected, the total amount of the fuel stored within the fuel tank 12 cannot be calculated accurately. Hence, the fuel amount measuring device 10 of this embodiment detects the amount of the fuel within the main storage part 14 and the amount of the fuel within the sub storage part 16, respectively.

It should be noted that a fuel pump (not shown) is disposed in the main storage part 14 of the fuel tank 12. The fuel pump sucks the fuel within the fuel tank 12 (specifically, within the main storage part 14) to be boosted, and supplies the boosted fuel outside the fuel tank 12 (namely, to an engine). On the other hand, since the fuel pump is disposed in the main storage part 14, it is necessary to transfer the fuel within the sub storage part 16 to the main storage part 14 when the liquid level of the fuel within the fuel tank 12 is lowered. The transfer of the fuel from the sub storage part 16 to the main storage part 14 is configured to be carried out by acceleration/deceleration of a speed during running or centrifugal force during turning, or to be carried out by a jet pump (not shown) which utilizes a part of the fuel discharged from the fuel pump.

The first fuel amount detector 36 is disposed within the main storage part 14. The first fuel amount detector 36 includes a float 32, an arm member 34 fixed on the float 32, a rotor 45 fixed at a base end of the arm member 34 and a magnetic sensor unit 41 configured to detect a rotational angle of the rotor 45. The float 32 floats on the fuel within the main storage part 14 and moves vertically in correspondence to the liquid level of the fuel. A tip end of the arm member 34 is fixed on the float 32. The rotor 45 is fixed on the base end of the arm member 34. The rotor 45 is made of a permanent magnet or the like so as to generate a predetermined magnetic field. The rotor 45 is rotatably supported on a casing 43. The magnetic sensor unit 41 is disposed in the casing 43. The magnetic sensor unit 41 detects the magnetic field generated by the rotor 45. Therefore, the vertical movement of the float 32 corresponding to the liquid level of the fuel within the main storage part 14 causes the arm member 34 to swing and the rotor 45 to rotate relative to the casing 43. Upon rotation of the rotor 45, an orientation of the magnetic field generated by the rotor 45 changes. Then, the orientation and intensity of the magnetic field of the rotor 45 detected by the magnetic sensor unit 41 change. The magnetic sensor unit 41 outputs an analog signal corresponding to the amount of the fuel stored within the main storage part 14 based on the detected orientation and intensity of the magnetic field of the rotor 45 (see FIG. 2). A detailed configuration of the magnetic sensor unit 41 will be described later.

The second fuel amount detector 22 has a same configuration as the first fuel amount detector 36 and includes a float 24, an arm member 26, a rotor 55 and a magnetic sensor unit 31. The float 24 moves in a vertical direction corresponding to a liquid level of the fuel within the sub storage part 16 and the vertical movement of the float 24 causes the arm member 26 to swing and causes the rotor 55 to rotate relative to the casing 53. The magnetic sensor unit 31 detects a rotational movement of the rotor 55 (specifically, the magnetic field of the rotor 55) and outputs an analog signal corresponding to the amount of the fuel stored within the sub storage part 16 based on a detection result hereby obtained.

The output synthetic circuit 38 is equipped in the casing 43 in which the first fuel amount detector 36 is disposed. Since the casing 43 is disposed within the fuel tank 12 (specifically, within the main storage part 14), the output synthetic circuit 38 is also disposed within the fuel tank 12. The output synthetic circuit 38 is connected to the fuel meter 52 disposed outside the fuel tank 12 (for example, a driver's seat) and also connected to the first and second fuel amount detectors 36 and 22 disposed within the fuel tank 12. Specifically, the output synthetic circuit 38 and the first fuel amount detector 36 are connected by a power source line 42b, a ground line 46b and a signal output line 44b. The first fuel amount detector 36 is actuated by power supplied from the power source line 42b to output the amount of the fuel stored within the main storage part 14 to the signal output line 44b. The output synthetic circuit 38 and the second fuel amount detector 22 are connected by a power source line 42c, a ground line 46c and a signal output line 44c. The second fuel amount detector 22 is actuated by power supplied from the power source line 42c to output the amount of the fuel stored within the sub storage part 16 to the signal output line 44c. Since the output synthetic circuit 38 is disposed within the fuel tank 12, the above-described lines 42b, 42c, 44b, 44c, 46b and 46c are also disposed within the fuel tank 12.

The output synthetic circuit 38 and the fuel meter 52 are connected by a power source line 42a, a ground line 46a and a signal output line 44a. Thus, power supplied from the fuel meter 52 is supplied via the power source lines 42a and 42b to the first fuel amount detector 36 and also supplied via the power source lines 42a, 42c to the second fuel amount detector 22. On the other hand, the outputted signal from the first fuel amount detector 36 (amount of the fuel within the main storage part 14) and the outputted signal from the second fuel amount detector 22 (amount of the fuel within the sub storage part 16) are added by the output synthetic circuit 38 to form an analog signal corresponding to the amount of the fuel within the fuel tank 12 and the formed analog signal is inputted to the fuel meter 52 by the signal output line 44a. As described above, the output synthetic circuit 38 is disposed within the fuel tank 12. Therefore, the lines (the power source line 42a, the ground line 46a and the signal output line 44a) configured to connect the output synthetic circuit 38 and the fuel meter 52 penetrate a lid member 40 configured to close an opening of the fuel tank 12 to extend from the inside of the fuel tank 12 to the outside thereof. In the present embodiment, the number of lines penetrating the lid member 40 is diminished by disposing the output synthetic circuit 38 within the fuel tank 12. A detailed configuration of the output synthetic circuit 38 will be described later.

It should be noted that the fuel meter 52 is provided with a CPU 48 and an indicator 50. The analog signal outputted from the output synthetic circuit 38 is inputted to the CPU 48. The CPU 48 determines the amount of the fuel stored within the fuel tank 12 based on the analog signal inputted from the output synthetic circuit 38 and indicates the determined fuel amount on the indicator 50. The CPU 48 and the indicator 50 can be configured in a similar manner to those of conventionally known fuel meters.

Next, the magnetic sensor units 41, 31 and output synthesis circuit 38 are explained in detail. As shown in FIG. 2, the signals from the magnetic sensor units 41, 31 are inputted to the output synthesis circuit 38, and the signals processed in the output synthesis circuit 38 are inputted to the fuel meter 52. The magnetic sensor units 41, 31 are firstly explained.

The magnetic sensor units 41 and 31 include magnetic sensors and converters configured to convert analog signals from the magnetic sensors. Each of the magnetic sensors is a magnetic type sensor configured to detect a rotational angle of the rotor 45 or 55 (namely, a rotational angle of the arm member 34 or 26) and for example, a known sensor utilizing a hole element can be used as the magnetic sensor. Each of the magnetic sensors outputs an output signal (analog signal) corresponding to the rotational angle of the rotor 45 or 55.

Each of the converters converts the output signal (analog signal) inputted from the magnetic sensors to an analog signal corresponding to the amount of the fuel stored within the main storage part 14 or the sub storage part 16. Specifically, the converter includes table data configured to convert the output signal (analog signal) from the magnetic sensor to the amount of the fuel stored within each of the storage parts 14, 16 (in detail, ratio (%) to a volume of each of the storage parts 14, 16). Specifically, a voltage value of the output signal (analog signal) from the magnetic sensor changes depending on the rotational angle of the rotor 45 or 55. The rotational angle of the rotor 45 or 55 is a rotational angle of the arm member 34 or 26. Therefore, the rotational angle of the rotor 45 or 55 changes depending on the liquid level of the fuel stored within the main storage part 14 or the sub storage part 16. Since shapes (transverse sectional shape) of the main storage part 14 and the sub storage part 16 are known, the amounts of the fuel stored within the main storage part 14 or the sub storage part 16 can be determined if the liquid level of the fuel stored within the main storage part 14 or the sub storage part 16 is specified. Thus, the converter converts the output signal (analog signal) of the magnetic sensor to an analog signal corresponding to the amount of the fuel stored within the main storage part 14 or the sub storage part 16, using the table data configured to convert "the output signal (voltage value) of the magnetic sensor" to "the liquid amount of the main storage part 14 or the sub storage part 16 (in detail, ratio (%) to a volume of each of the storage parts 14, 16)." For example, when the storage part 14 or 16 is filled with fuel, the converter converts an analog signal to a signal of potential indicating that the fuel amount is 100%. On the other hand, when no fuel is stored in the storage part 14 or 16, the converter converts an analog signal to a signal of potential indicating that the fuel amount is 0%. The analog signals converted by the converter are outputted to the output synthesis circuit 38. The table data changes depending on a shape of the storage part 14 or 16, as is evident from the above explanation. Therefore, table data preliminarily created depending on the shape of the main storage part 14 is stored in the magnetic sensor unit 41, whereas table data preliminarily created depending on the shape of the sub storage part 16 is stored in the magnetic sensor unit 31.

Figure 3A:
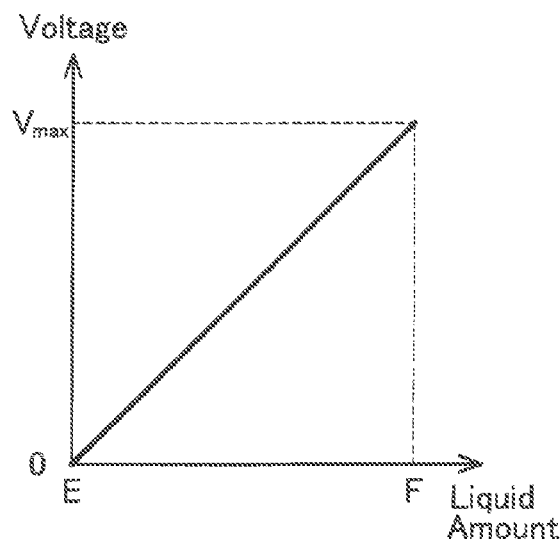
FIG. 3A is a diagram for explaining functions of magnetic sensor units.
Figure 3B:
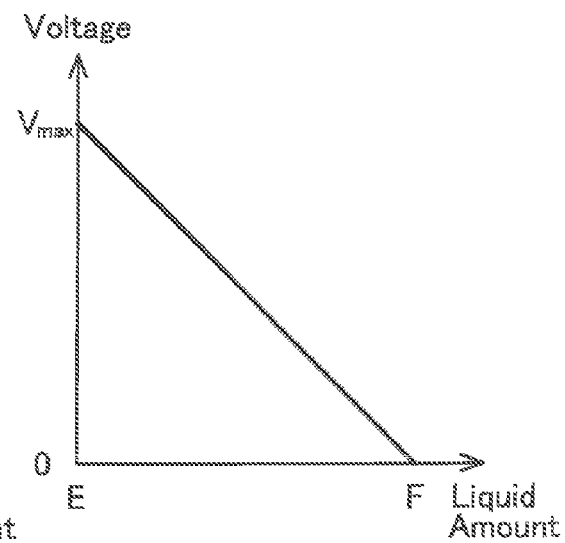
FIG. 3B is another diagram for explaining functions of magnetic sensor units.

The output synthesis circuit 38 includes an inverter amplifier circuit 62 in this embodiment, as will be described below. Therefore, the signals outputted by the magnetic sensor units 41, 31 are inputted to the fuel meter 52 after being inverted in the output synthesis circuit 38. The converters of the magnetic sensor units 41, 31 are configured to output the inverted signals to the output synthesis circuit 38 so that a known fuel meter can be employed for the fuel meter 52. Specifically, in conventional techniques, settings have been performed, as shown in FIG. 3A, such that a voltage of the output signal when a storage part is filled with fuel is [Vmax](e.g. 4.5 V), whereas a voltage of the output signal when no fuel is stored in a storage part is [Vmin](e.g. 0 V). In other words, when a range of the signals outputted by the magnetic sensor units is Vmax to Vmin, the voltage when the storage part is full is set to be Vmax, whereas the voltage when no fuel is stored in the storage part is set to be Vmin. However, in the magnetic sensor units 41, 31 of this embodiment, as shown in FIG. 3 (b), settings are performed such that the voltage of the output signal for each of the storage parts 14, 16 when the relevant storage part 14, 16 is filled with fuel is [Vmin](e.g. 0 V), whereas the voltage of the output signal thereof when no fuel is stored in the relevant storage part 14, 16 is [Vmax](e.g., 4.5 V). Thus, the signals from the output synthesis circuit 38 become similar to conventional signals, thereby allowing for use of the fuel meter 52 similar to a conventional fuel meter.

Next, the output synthesis circuit 38 will be explained. As shown in FIG. 2, the output synthesis circuit 38 includes a correction adder circuit 60 configured to correct and add signals (analog signals) from the magnetic sensor units 41, 31 and the inverter amplifier circuit 62 configured to invert and amplify the signals from the correction adder circuit 60.

The correction adder circuit 60 corrects the output signals (analog signals) from the magnetic sensor unit 41 depending on the volume of the main storage part 14, and also corrects the output signals (analog signals) from the magnetic sensor unit 31 depending on the volume of the sub storage part 16 to add these corrected signals. In other words, the magnetic sensor units 41 and 31 have the same configuration as described above such that the range of the output signals (analog signal) from the magnetic sensor unit 41 is defined as identical with the range of the output signals (analog signal) from the magnetic sensor unit 31. On the other hand, the volume of the main storage part 14 and the volume of the sub storage part 16 are different. Therefore, if the output signals (analog signals) from the magnetic sensor unit 41 and the output signals (analog signals) from the magnetic sensor unit 31 are added as they are without any change, the amount of fuel in the fuel tank 12 cannot be correctly calculated. Thus, correction is made so that a scale (output voltage value per unit fuel amount) of the signals outputted by the first fuel amount detector 36 (magnetic sensor unit 41) and the scale (output voltage value per unit fuel amount) of the signals outputted by the second fuel amount detector 22 (magnetic sensor unit 31) are the same as each other.

For example, in a case where a maximum fuel amount Q1 can be stored within the main storage part 14 and a maximum fuel amount Q2 can be stored within the sub storage part 16, the signal outputted by the first fuel amount detector 36 is weighted by a coefficient (Q1/(Q1+Q2)) and the signal outputted by the second fuel amount detector 22 is weighted by a coefficient (Q2/(Q1+Q2)). The above method also can make the scales of the signals outputted by the first and second fuel amount detectors 36 and 22 to be the same, thereby making it possible for the fuel amount stored in the liquid tank 12 to be determined by adding both of the signals.

Alternatively, a circuit may also be configured as shown in FIG. 2. In the correction adder circuit 60 shown in FIG. 2, a signal output line 44b from the magnetic sensor unit 41 is connected to a connection point 64 via a resistance R1, and a signal output line 44c from the magnetic sensor unit 31 is connected to the connection point 64 via a resistance R2. The connection point 64 is connected to an input terminal of the fuel meter 52 via the inverter amplifier circuit 62. Thus, a voltage Vout at the connection point 64 is a value obtained by proportionally dividing a voltage V1 of the output signal from the magnetic sensor unit 41 and a voltage V2 of the output signal from the magnetic sensor unit 31 by the resistances R1, R2. Specifically, the voltage Vout at the connection point 64 is V2+(V1−V2)×R2/(R1+R2)=R2×V1/(R1+R2)+R1×V2/(R1+R2). Thus, the resistance R1 is defined as a resistance value corresponding to the volume ratio of the sub storage part 16 (volume of the sub storage part 16/volume of the fuel tank 12), and the resistance R2 is defined as a resistance value corresponding to the volume ratio of the main storage part 14 (volume of the main storage part 14/volume of the fuel tank 12). Thus, the voltage Vout (voltage at the connection point 64) of the output signal from the correction adder circuit 60 becomes a value corresponding to the amount of fuel in the fuel tank 12.

As a specific example, a case where the volume of the main storage part 14 is 30 liters and the volume of the sub storage part 16 is 20 liters, is explained. In this case, the range of the output signals from the magnetic sensor units 41, 31 is assumed to be 0 V to 4.5 V. It is also assumed that 20 liters of fuel is stored in the main storage part 14, 10 liters of fuel is stored in the sub storage part 16, and 30 liters of fuel is stored in the fuel tank 12. In this case, the signal outputted by the magnetic sensor unit 41 is 4.5×20/30=3.0 V, and the signal outputted by the magnetic sensor unit 31 is 4.5×10/20=2.25 V. As described above, if the resistance R1 is defined as a resistance value (e.g., 2 kΩ) corresponding to the volume ratio of the sub storage part 16 and the resistance R2 is defined as a resistance value (e.g., 3 kΩ) corresponding to the volume ratio of the main storage part 14, the voltage Vout (voltage at the connection point 64) of the output signal from the correction adder circuit 60 is (⅗)×3.0+(⅖)×2.25=2.7 V. Thus, the output voltage Vout is 2.7 V, and it is indicated that the fuel stored in the fuel tank 12 is 60% (=2.7/4.5), namely, 30 liters of fuel (correct fuel amount) is stored therein.

If the volumes of the main storage part 14 and the sub storage part 16 are the same as each other, the values of the resistances R1 and R2 become the same as each other. Therefore, the signal Vout outputted by the correction adder circuit 60 becomes ½×(V1+V2), an average value of the voltage V1 of the output signal from the magnetic sensor unit 41 and the voltage V2 of the output signal from the magnetic sensor unit 31.

The inverter amplifier circuit 62 inverts and amplifies the signal Vout outputted by the correction adder circuit 60, and outputs the inverted and amplified signal to the fuel meter 52. As described above, the signals outputted by the magnetic sensor units 41, 31 are inverted and then outputted (state shown in FIG. 3B). Thus, the inverter amplifier circuit 62 inverts the signal Vout outputted by the correction adder circuit 60 so that the signal inputted to the fuel meter 52 is returned back to the state before the inversion (state shown in FIG. 3A).

Also, in this embodiment, the correction adder circuit 60 (resistances R1, R2) is arranged between the magnetic sensor units 41, 31 and the fuel meter 52. Therefore, a voltage of a signal inputted to the fuel meter 52 decreases in this state as compared with a case where no correction adder circuit 60 is arranged between the magnetic sensor units 41, 31 and the fuel meter 52. Specifically, the range of the signals outputted by the magnetic sensor units 41, 31 and the range of the signals inputted to the fuel meter 52 undesirably change so that the fuel amount is not correctly indicated on the fuel meter 52 in this state.

Thus, in this embodiment, by inverting and amplifying the signals outputted from the correction adder circuit 60, the signals inputted to the fuel meter 52 are returned back to the state (state shown in FIG. 3A) before the inversion and the signals are amplified so that the range of the signals outputted by the magnetic sensor units 41, 31 and the range of the signals inputted to the fuel meter 52, are consistent with each other. This makes it possible to correctly indicate the amount of fuel within the fuel tank 12 on the fuel meter 52 even when the fuel meter 52 has the same configuration as a conventional configuration.

Specifically, the inverter amplifier circuit 62 includes an operational amplifier 66 as shown in FIG. 2. The connection point 64 is connected to an − input terminal of the operational amplifier 66 so that the output signal Vout from the correction adder circuit 60 is inputted. An output terminal of the operational amplifier 66 is further connected via a resistance R5 to the − input terminal of the operational amplifier 66. A voltage obtained by proportionally dividing a power source voltage Vdd by resistances R7, R8 is inputted to a + input terminal of the operational amplifier 66. The output terminal of the operational amplifier 66 is connected to the fuel meter 52 via a resistance R6. Thus, the output signal Vout from the correction adder circuit 60 is inverted and amplified by the operational amplifier 66 and then inputted to the fuel meter 52. Therefore, appropriate settings of the resistances R5 to R8 enable the range of the signals outputted from the magnetic sensor units 41, 31 to be consistent with the range of the signal inputted to the fuel meter 52.

As is evident from the above explanation, the fuel amount measuring device 10 of this embodiment detects the amount of fuel in the main storage part 14 by the first fuel amount detector 36, detects the amount of fuel in the sub storage part 16 by the second fuel amount detector 22, and adds these amounts in the output synthesis circuit 38 to be outputted to the fuel meter 52. Therefore, the number of signal output lines which connect the fuel amount measuring device 10 and the fuel meter 52 can be one.

Also, in the fuel amount measuring device 10 of this embodiment, the inverter amplifier circuit 62 amplifies the signals so that the range of the signal inputted to the fuel meter 52 is identical with the ranges of the signals outputted by the magnetic sensor units 41, 31. Therefore, the fuel meter 52 is technically brought in a same state as a state where one fuel amount detector is connected to the fuel meter 52, as seen from a viewpoint of the fuel meter 52. Therefore, a necessity to change the configuration of the fuel meter 52 can be eliminated even when a plurality of fuel amount detectors is mounted in the fuel tank 12.

Finally, correspondences between the configurations of this embodiment and the recitation of the claims are herein described. The resistances R1, R2 of the output synthesis circuit 38 are examples of the "correction circuit." Wiring connecting the resistances R1, R2 and the connection point 64, and the inverter amplifier circuit 62 are examples of the "output circuit." Also, wiring connecting the resistances R1, R2 and the connection point 64 is an example of the "adder," and the inverter amplifier circuit 62 is an example of the "inversion amplifier."

While specific examples of the present invention have been described above in detail, these examples are merely illustrative and place no limitation on the scope of the patent claims. The technology described in the patent claims also encompasses various changes and modifications to the specific examples described above.

For example, in the embodiment described above, the signals outputted by the fuel amount detectors 36, 22 are corrected by the resistances R1, R2 so as to be signals corresponding to the volumes of the main storage part 14 and the sub storage part 16 but the technique disclosed in the present specification is not limited to such an example. For example, the signals may be directly converted to the amount of fuel stored in the storage parts 14, 16 in the magnetic sensor units 41, 31 and then the converted signals may be outputted. When such a configuration is adopted, it is only necessary to make the table data stored in the magnetic sensor units 41, 31 corresponding to the shapes of the storage parts 14, 16. In this case, the "correction circuits" would be built in the magnetic sensor units 41, 31.

Figure 4:
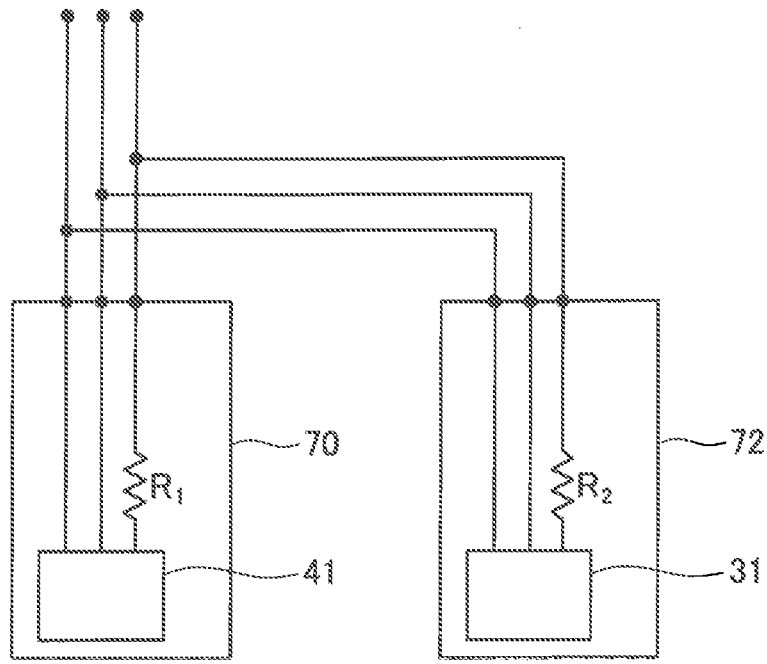
FIG. 4 is a diagram showing another example of a circuit configuration of the liquid amount measuring device.
Figure 5:
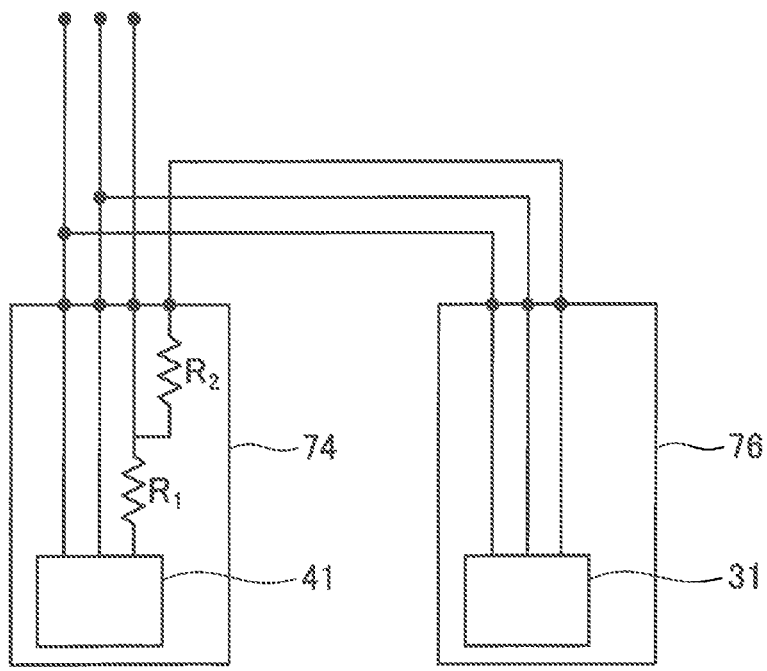
FIG. 5 is a diagram showing another example of a circuit configuration of the liquid amount measuring device.

Also, in the above-described embodiment, the resistances R1, R2 configured to correct the signals from the magnetic sensor units 41, 31 are arranged in the output synthesis circuit 38 provided separately from the magnetic sensor units 41, 31 but the technique disclosed in the present specification is not limited to such an example. For example, as shown in FIG. 4, a resistance R1 for correction may be mounted on a circuit board 70 on which the magnetic sensor unit 41 is mounted, and a resistance R2 for correction may be mounted on a circuit board 76 on which the magnetic sensor unit 31 is mounted. Alternatively, as shown in FIG. 5, resistances R1, R2 for correction may be mounted on the circuit board 70 on which the magnetic sensor unit 41 is mounted, and no resistance for correction may be mounted on the circuit board 76 on which the magnetic sensor unit 31 is mounted.

Also, the technique disclosed in the present specification is not limited to such example as the fuel amount measuring device arranged in the saddle-shaped fuel tank 12 which has been explained in the above-described embodiment. For example, this technique can be applied also to a case where fuel is stored in a plurality of independent fuel tanks. In this case, a fuel amount detector is arranged in each of the fuel tanks, and detection results of these detectors are outputted to a fuel meter via an output synthesis circuit.

The two storage parts 14, 16 are provided in the fuel tank 12, and the fuel amount detectors 36, 22 are arranged in the storage parts 14, 16, in the above-described embodiment. However, three or more storage parts may be provided in the fuel tank. In this case, it is only necessary to arrange a fuel amount detector in each of the storage parts, to input output signals by the respective fuel amount detectors to an adder, and to add the output signals in the adder.

The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A liquid amount measuring device, comprising:
a plurality of detectors arranged within a vessel, wherein the vessel includes a plurality of storage parts with different volumes, and each of the plurality of detectors is arranged in a corresponding one of the storage parts and configured to output a first analog signal;
an output circuit configured to output an analog detection signal corresponding to an amount of the liquid stored in the vessel based on the first analog signals outputted by the plurality of detectors; and
correction circuits, each of which is arranged between the corresponding detector and the output circuit, wherein each correction circuit is configured to correct the first analog signal outputted by the corresponding detector and output the corrected first analog signal to the output circuit,
wherein each of the detectors includes a float; an arm member configured to convert a vertical motion of the float to a rotational motion; and a magnetic sensor configured to output a second analog signal corresponding to the rotational motion of the arm member,
each of the detectors is configured to output the first analog signal based on the second analog signal,
each of the correction circuits is provided in the corresponding detector, and configured to correct the corresponding first analog signal such that each of the corrected first analog signals has a same output voltage value per unit volume, and
the corrected first analog signals outputted from the correction circuits are inputted to the output circuit, and the output circuit outputs the analog detection signal corresponding to the amount of the liquid stored in the vessel based on the corrected first analog signals that were inputted.

2. The liquid amount measuring device according to claim 1, wherein
the plurality of storage parts are configured such that each of liquid levels of the storage parts changes independently,
one detector is arranged within each of the storage parts; and
each of the correction circuits includes a resistance corresponding to a ratio of a maximum storable amount of the liquid in the corresponding storage part to a maximum storable amount of the liquid in the vessel.

3. The liquid amount measuring device according to claim 2, wherein
the magnetic sensor of each of the detectors and the corresponding correction circuit to which the second analog signal from the magnetic sensor is inputted are mounted on a same circuit board.

4. The liquid amount measuring device according to claim 3, wherein
the output circuit further includes an addition function configured to add voltage values of the corrected first analog signals outputted by the correction circuits.

5. The liquid amount measuring device according to claim 4, wherein
the vessel is a saddle-shaped vessel, the plurality of storage parts including a first storage part having a first depth, a second storage part having a second depth, and a connecting part connecting an upper portion of the first storage part to an upper portion of the second storage part, a depth of the connecting part being shallower than the first and second depths, and one detector is arranged within each of the first and second storage parts, and the output circuit is arranged within the vessel.

6. The liquid amount measuring device according to claim 5, wherein the output circuit further includes an adder configured to perform the addition function and a signal amplifier configured to amplify a third analog signal outputted by the adder, the signal amplifier amplifies the third analog signal outputted by the adder such that an output range of the third analog signal outputted by the adder becomes a predetermined output range, and the output circuit is configured to output the analog detection signal based on the third analog signal.

7. The liquid amount measuring device according to claim 2, wherein the magnetic sensor for one of the detectors, the corresponding correction circuit to which the second analog signal from the magnetic sensor is inputted, and another correction circuit to which the second analog signal from another one of the detectors is inputted, are mounted on a same circuit board.

8. The liquid amount measuring device according to claim 7, wherein the output circuit further includes an addition function configured to add voltage values of the corrected first analog signals outputted by the correction circuits.

9. The liquid amount measuring device according to claim 8, wherein the vessel is a saddle-shaped vessel, the plurality of storage parts including a first storage part having a first depth, a second storage part having a second depth, and a connecting part connecting an upper portion of the first storage part to an upper portion of the second storage part, a depth of the connecting part being shallower than the first and second depths, one detector is arranged within each of the first and second storage parts, and the output circuit is arranged within the vessel.

10. The liquid amount measuring device according to claim 9, wherein the output circuit further includes an adder configured to perform the addition function and a signal amplifier configured to amplify a third analog signal outputted by the adder, the signal amplifier amplifies the third analog signal outputted by the adder such that an output range of the third analog signal outputted by the adder becomes a predetermined output range, and the output circuit is configured to output the analog detection signal based on the third analog signal.

11. The liquid amount measuring device according to claim 1, wherein the output circuit further includes an addition function configured to add voltage values of the corrected first analog signals outputted by the correction circuits.

12. The liquid amount measuring device according to claim 1, wherein the vessel is a saddle-shaped vessel, the plurality of storage parts including a first storage part having a first depth, a second storage part having a second depth, and a connecting part connecting an upper portion of the first storage part to an upper portion of the second storage part, a depth of the connecting part being shallower than the first and second depths, one detector is arranged within each of the first and second storage parts, and the output circuit is arranged within the vessel.

13. The liquid amount measuring device according to claim 1, wherein the output circuit further includes an adder configured to add voltage values of the corrected first analog signals outputted by the correction circuits; and a signal amplifier configured to amplify a third analog signal outputted by the adder, the signal amplifier amplifies the third analog signal outputted by the adder such that an output range of the third analog signal outputted by the adder becomes a predetermined output range, and the output circuit is configured to output the analog detection signal based on the third analog signal.

14. A liquid amount measuring device configured to output an analog detection signal corresponding to an amount of liquid stored in a vessel that includes a plurality of storage parts with different volumes, the liquid amount measuring device comprising:

a plurality of detectors arranged within the vessel, each of the plurality of detectors is arranged in a corresponding one of the storage parts and; and an output circuit configured to output the analog detection signal corresponding to the amount of the liquid stored in the vessel based on first analog signals outputted by the plurality of detectors, correction circuits, each of which is arranged between the corresponding detector and the output circuit, wherein each correction circuit is configured to correct the first analog signal outputted by the corresponding detector and output the corrected first analog signal to the output circuit, wherein the output circuit includes an adder configured to add the first analog signals outputted by the detectors, and a signal amplifier configured to amplify an adder analog signal outputted by the adder, each of the correction circuits is provided in the corresponding detector, and configured to correct the corresponding first analog signal such that each of the corrected first analog signals has a same output voltage value per unit volume, and the signal amplifier amplifies the adder analog signal outputted by the adder such that an output range of the adder analog signal outputted by the adder becomes a predetermined output range.

* * * * *